(12) United States Patent
Blomqvist

(10) Patent No.: US 10,212,140 B2
(45) Date of Patent: Feb. 19, 2019

(54) KEY MANAGEMENT

(71) Applicant: Nokia Technologies Oy, Espoo (FI)

(72) Inventor: Kim Blomqvist, Espoo (FI)

(73) Assignee: Nokia Technologies Oy, Espoo (FI)

( * ) Notice: Subject to any disclaimer, the term of this patent is extended or adjusted under 35 U.S.C. 154(b) by 131 days.

(21) Appl. No.: 15/112,376

(22) PCT Filed: Feb. 18, 2014

(86) PCT No.: PCT/FI2014/040118
§ 371 (c)(1),
(2) Date: Jul. 18, 2016

(87) PCT Pub. No.: WO2015/124825
PCT Pub. Date: Aug. 27, 2015

(65) Prior Publication Data
US 2016/0337325 A1    Nov. 17, 2016

(51) Int. Cl.
H04L 29/06 (2006.01)
H04W 12/04 (2009.01)
H04L 9/32 (2006.01)
H04W 4/80 (2018.01)

(52) U.S. Cl.
CPC .......... *H04L 63/061* (2013.01); *H04L 9/3247* (2013.01); *H04L 9/3263* (2013.01); *H04L 63/0442* (2013.01); *H04W 12/04* (2013.01); *H04L 63/0272* (2013.01); *H04L 63/166* (2013.01); *H04L 2209/80* (2013.01); *H04W 4/80* (2018.02)

(58) Field of Classification Search
CPC .................................................... H04L 63/061
USPC ........................................................ 713/151
See application file for complete search history.

(56) References Cited

U.S. PATENT DOCUMENTS 8,086,859 B2 * 12/2011 Pavlicic ............... G06F 21/645
                                                                    713/176
2008/0137859 A1  6/2008 Jagadeesan et al.
2008/0162935 A1 * 7/2008 Ginzboorg ........... H04L 9/0822
                                                                    713/170
(Continued)

FOREIGN PATENT DOCUMENTS

CN      101785240 A    7/2010
CN        1996832 A    8/2011
(Continued)

OTHER PUBLICATIONS

International Search Report and Written Opinion received for corresponding Patent Cooperation Treaty Application No. PCT/FI2014/050118, dated Aug. 28, 2014, 11 pages.
(Continued)

*Primary Examiner* — Khalil Naghdali
(74) *Attorney, Agent, or Firm* — Seppo Laine Oy

(57) ABSTRACT

According to an example embodiment of the present invention there is provided an apparatus comprising a receiver configured to receive a pair of cryptographic keys comprising a public key and a secret key, the public key being cryptographically signed, a memory configured to store the secret key, and a transmitter configured to send the cryptographically signed public key to a correspondent node and participate in establishment of a cryptographic network protocol session based at least in part on the pair of cryptographic keys.

11 Claims, 6 Drawing Sheets

(56) References Cited

U.S. PATENT DOCUMENTS

| | | | |
|---|---|---|---|
| 2010/0070771 A1 | 3/2010 | Chen et al. | |
| 2010/0325427 A1* | 12/2010 | Ekberg | H04L 9/321 |
| | | | 713/156 |
| 2011/0093710 A1* | 4/2011 | Galvin | H04L 63/061 |
| | | | 713/169 |
| 2011/0291803 A1 | 12/2011 | Bajic et al. | |
| 2011/0313922 A1 | 12/2011 | Ben Ayed | |
| 2013/0246206 A1 | 9/2013 | Huang et al. | |
| 2013/0336487 A1 | 12/2013 | Jan | |
| 2013/0343545 A1 | 12/2013 | Schiefelbein | |
| 2014/0011541 A1* | 1/2014 | Cormier | H04W 8/183 |
| | | | 455/558 |
| 2014/0244998 A1* | 8/2014 | Amenedo | H04L 63/062 |
| | | | 713/156 |
| 2014/0281477 A1* | 9/2014 | Nayshtut | H04L 9/0825 |
| | | | 713/150 |
| 2015/0067329 A1* | 3/2015 | Ben Saied | H04L 9/0838 |
| | | | 713/168 |

FOREIGN PATENT DOCUMENTS

| | | |
|---|---|---|
| CN | 102170300 A | 8/2011 |
| CN | 202918290 U | 5/2013 |
| EP | 2533488 A1 | 12/2012 |
| WO | 2006/027725 A1 | 3/2006 |

OTHER PUBLICATIONS

IETF Networking Group; The TLS Protocol Version 1.0. Jan. 1999. Internet Engineering Task Force, [retrieved on Aug. 25, 2014]. Retrieved from the Internet <URL:http://tools/ieft.org/odf/rfc2246.pdf>.

"Real Estate systems", Schneider Electric, Retrieved on Jul. 18, 2017, Webpage available at : http://www.schneider-electric.fi/fi/work/solutions/system/s1/buildings-systems.jsp.

Pham, "Security of NFC Applications", Thesis, Jun. 30, 2013, 102 pages.

"Why Is Nobody Using SSL Client Certificates", Gnegg Field intentionally left blank, Retrieved on Jul. 26, 2017, Webpage available at : https://blog.pilif.me/2008/05/26/why-is-nobody-using-ssl-client-certificates/.

"NFC Tag With User Authentication", Stackoverflow, Retrieved on Jul. 26, 2017, Webpage available at : http://stackoverflow.com/questions/11875393/nfc-tag-with-user-authentication.

"French Winery Picks NFC Tags for Authentication", NFC World Knowledge Centre, NFC World, Retrieved on Jul. 26, 2017, Webpage available at : http://www.nfcworld.com/2013/06/25/324783/french-winery-picks-nfc-tags-for-authentication/.

"NFC Tags", NFCtags.com, Retrieved on Jul. 26, 2017, Webpage available at : http://www.nfctags.com/product-authentication-nfc-tags.

"Identification Cards—Integrated Circuit Cards—Part 4: Organization, Security and Commands for Interchange", ISO/IEC 7816-4, Jan. 15, 2005, 90 pages.

"NFC/RFID Controller", NT Lab, 01801P_NT1046, Version 13, Dec. 2015, pp. 1-5.

"Trusted Tag Services",Hidglobal, Retrieved on Jul. 26, 2017, Webpage available at : https://www.hidglobal.com/solutions/trusted-tag-services.

"Identification Cards—Contactless Integrated Circuit(s) Cards—Proximity Cards—Part 4: Transmission Protocol", ISO/IEC 14443-4, Jun. 1, 2016, 7 pages.

"IBM Taps Into NFC With New Dual-Factor Authentication Tool for Mobile", IT Proportal, Retrieved on Jul. 18, 2017, Webpage available at : http://www.itproportal.com/2013/10/22/ibm-taps-into-nfc-with-new-dual-factor-authentication-tool-for-mobile/.

Extended European Search Report received for corresponding European Patent Application No. 14883296.7, dated Jul. 13, 2017, 6 pages.

* cited by examiner

KEY MANAGEMENT

RELATED APPLICATION

This application was originally filed as PCT Application No. PCT/FI2014/050118 filed Feb. 18, 2014.

FIELD OF INVENTION

The invention relates to the field of encrypted communication sessions and management of encryption keys.

BACKGROUND OF INVENTION

Digital information may be transmitted in plaintext, or unencrypted, form or in encrypted form. Plaintext form is simple to handle as no specific processing is necessary to obtain a plaintext. On the other hand, where plaintext is used in communication, the contents of a communication may be discovered by an eavesdropper simply by gaining access to a transmission medium used to convey the plaintext.

Encryption may be employed to render it more difficult for an eavesdropper to gain access to the contents of a communication. Instead of communicating the plaintext, which may be readable by a human unaided, a ciphertext is communicated over the transmission medium. The ciphertext is derived from the plaintext using an encryption algorithm, which is designed to make it difficult for eavesdroppers to reverse the operation and obtain the plaintext from the ciphertext.

An encryption algorithm may use the plaintext and a key as inputs, wherein using the algorithm in the reverse direction, that is to obtain the plaintext from a ciphertext, which is known as decryption, is difficult without the key.

In symmetric cryptography, the same key is used to encrypt plaintext to ciphertext and to decrypt ciphertext to plaintext. The key needs to be communicated between the sender and recipient in a way that an eavesdropper cannot obtain access to it, since with the key and the ciphertext obtained from the transmission medium the eavesdropper could access the plaintext. The key, known after the encryption type as a symmetric key, may be communicated out-of-band, for example via registered letter, personal visit or diplomatic pouch. This is known as a secure key exchange.

In public-key cryptography, also known as asymmetric cryptography, there exist two kinds of keys, public and secret keys which exist as pairs. A secret key of a public-key cryptography system may alternatively be referred to as a private key. A first user may share his public key freely, while carefully retaining his secret key. A second user may encrypt a plaintext to a ciphertext using the public key. A public-key encryption system is designed so that the plaintext is obtainable from the ciphertext only using the secret key. Due to this property, an eavesdropper cannot obtain the plaintext even if he obtains the ciphertext and public key from the transmission medium. Therefore unlike symmetric cryptography, asymmetric cryptography employs different keys in encryption and decryption and avoids the need for a secure key exchange.

Public-key cryptography algorithms are based on mathematical problems which currently admit no efficient solution that are inherent in certain integer factorization, discrete logarithm, and elliptic curve relationships. It is computationally straightforward for the first user to generate a personal public and secret key pair and to use them for encryption and decryption. The strength of the algorithm lies in the fact that it is computationally infeasible for a properly generated secret key to be determined from its corresponding public key. Thus the public key may be published without compromising security, whereas the secret key must not be revealed to anyone not authorized to read messages or perform digital signatures. An example of a public-key cryptography algorithm is the ElGamal algorithm.

SUMMARY OF THE INVENTION

According to a first aspect of the present invention there is provided an apparatus comprising a receiver configured to receive a pair of cryptographic keys comprising a public key and a secret key, the public key being cryptographically signed, a memory configured to store the secret key, and a transmitter configured to send the cryptographically signed public key to a correspondent node and participate in establishment of a cryptographic network protocol session based at least in part on the pair of cryptographic keys.

In various embodiments in accordance with the first aspect, there is comprised therein at least one feature from the following bulleted list:

- the receiver is configured to receive the pair of cryptographic keys over a short-range wireless interface
- the short-range wireless interface comprises a near field communication or Bluetooth or ZigBee interface
- the apparatus is configured to receive the pair of cryptographic keys from a stationary device fixed to a location
- the cryptographic network protocol comprises at least one of a secure shell protocol, a secure virtual private network protocol and transport layer security protocol, TLS, or its predecessor, secure sockets layer, SSL, protocol.
- the apparatus is configured to act as an endpoint in the cryptographic network protocol session at least in part by decrypting information received over the cryptographic network protocol session using the secret key
- the apparatus is configured to receive a public key of the correspondent node in encrypted form, to decrypt the public key of the correspondent node using the secret key and to use the decrypted public key of the correspondent node to encrypt information before sending it to the correspondent node using the cryptographic network protocol session.

According to a second aspect of the present invention, there is provided a method comprising receiving a pair of cryptographic keys comprising a public key and a secret key, the public key being cryptographically signed, storing the secret key, and sending the public key to a correspondent node and participating in establishment of a cryptographic network protocol session based at least in part on the pair of cryptographic keys.

In various embodiments in accordance with the second aspect, there is comprised therein at least one feature corresponding to at least one feature from the preceding bulleted list laid out in connection with the first aspect.

According to a third aspect of the present invention, there is provided an apparatus comprising a receiver configured to receive an indication a node is within communication range, at least one processing core configured to obtain a pair of cryptographic keys comprising a secret key and a public key and to cryptographically sign the public key, and a transmitter configured to provide the pair of cryptographic keys to the node.

In various embodiments in accordance with the third aspect, there is comprised therein at least one feature from the following bulleted list:

the receiver is configured to receive the indication over a short-range wireless interface the short-range wireless interface comprises a near field communication or Bluetooth or ZigBee interface the apparatus comprises a short-range node the apparatus comprises a near field communication tag.

According to a fourth aspect of the present invention, there is provided a method, comprising receiving an indication a node is within communication range, obtaining a pair of cryptographic keys comprising a secret key and a public key and cryptographically signing the public key, and providing the pair of cryptographic keys to the node.

In various embodiments in accordance with the fourth aspect, there is comprised therein at least one feature corresponding to at least one feature from the preceding bulleted list laid out in connection with the third aspect.

According to a fifth aspect of the present invention, there is provided an apparatus comprising means for receiving a pair of cryptographic keys comprising a public key and a secret key, the public key being cryptographically signed, means for storing the secret key, and means for sending the public key to a correspondent node and for participating in establishment of a cryptographic network protocol session based at least in part on the pair of cryptographic keys.

According to a sixth aspect of the present invention, there is provided an apparatus, comprising means for receiving an indication a node is within communication range, means for obtaining a pair of cryptographic keys comprising a secret key and a public key and for cryptographically signing the public key, and means for providing the pair of cryptographic keys to the node.

According to a seventh aspect of the present invention, there is provided a non-transitory computer readable medium having stored thereon a set of computer readable instructions that, when executed by at least one processor, cause an apparatus to at least receive a pair of cryptographic keys comprising a public key and a secret key, the public key being cryptographically signed, store the secret key, and send the public key to a correspondent node and participate in establishment of a cryptographic network protocol session based at least in part on the pair of cryptographic keys According to an eighth aspect of the present invention, there is provided a non-transitory computer readable medium having stored thereon a set of computer readable instructions that, when executed by at least one processor, cause an apparatus to at least receive an indication a node is within communication range, obtain a pair of cryptographic keys comprising a secret key and a public key and cryptographically sign the public key, and provide the pair of cryptographic keys to the node.

INDUSTRIAL APPLICABILITY

At least some embodiments of the present invention find application in providing high usability and/or high security encrypted communications.

DETAILED DESCRIPTION OF EXAMPLE EMBODIMENTS

By providing encryption keys in a localized fashion via a short-range interaction, setup of a secured protocol connection may be facilitated since it may be assumed that the device initiating the protocol connection is in a specific location. Where the specific location is access-controlled, such as for example a corporate headquarters or research department, it may be assumed users are authorized and a separate step of entering a password may be omitted. Thus an encrypted connection may be setup in a user-friendly way.

Figure 1:
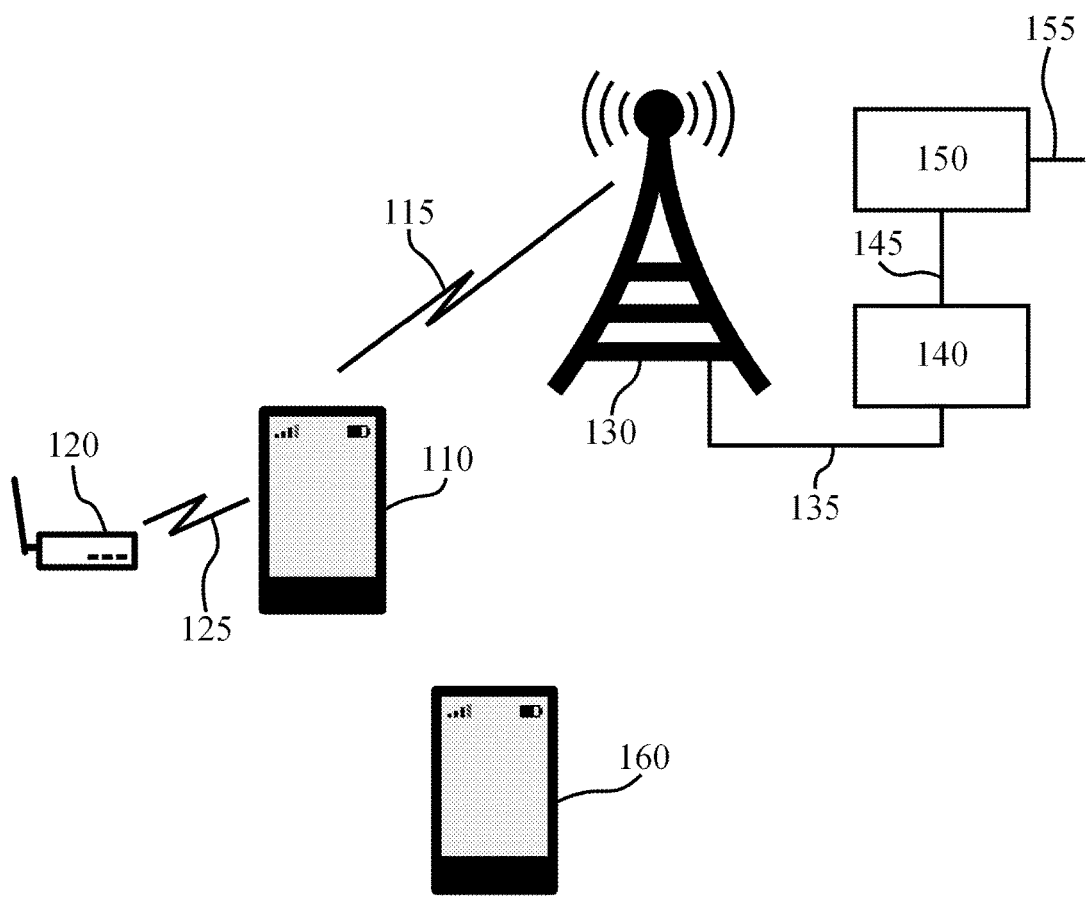
FIG. 1 illustrates an example system capable of supporting at least some embodiments of the present invention.

FIG. 1 illustrates an example system capable of supporting at least some embodiments of the present invention. Illustrated is base station 130, which may comprise a cellular or non-cellular base station. A non-cellular base station may be referred to as an access point, but the term base station is used hereinafter for the sake of clarity. Base station 130 may be arranged to operate in accordance with a cellular communication standard, such as for example wideband code division multiple access, WCDMA, or long term evolution, LTE. Base station 130 may be arranged to operate in accordance with a non-cellular communication standard, such as for example wireless local area network, WLAN, also known as Wi-Fi, or worldwide interoperability for microwave access, WiMAX. Base station 130 may be configured to establish wireless links with mobile devices in accordance with any standard or standards base station 130 is arranged to operate in accordance with.

Base station 130 may be configured to control at least one cell. Base station 130 may be configured to control more than one cell, each of the cells being characterized by a cell coverage area. Overlapping cell coverage areas are possible in case the cells operate at different operating frequencies. Base station 130 may receive mobile units into cells it controls via handover procedures, in case the mobile units move into a cell coverage area of a cell controlled by base station 130.

Base station 130 may be operably connected, via connection 135, to network node 140. Network node 140 may comprise, for example, a base station controller, radio network controller, mobility management entity or other node. Network node 140 may in turn be operably connected, via connection 145, to gateway 150. Gateway 150 may provide connectivity, via connection 155, to further networks, for example, in some embodiments, to the Internet. Connections 135, 145 and 155 may each be wire-line connections, or at least in part wireless. Each of connections 135, 145 and 155 need not be of the same type.

FIG. 1 illustrates also mobile 110, which may comprise, for example, a cellular telephone, smartphone, tablet device, phablet device, laptop computer or other electronic device with wired or wireless communication capability. In the illustrated example, mobile 110 has wireless link 115 with base station 130. Wireless link 115 may operate in accordance with a wireless standard that both mobile 110 and base station 130 are configured to support. Wireless link 115 may comprise an uplink for conveying information from mobile 110 to base station 130. Wireless link 115 may comprise a downlink for conveying information from base station 130 to mobile 110. Wireless link 115 may be arranged to operate in accordance with time division multiple access TDMA, code division multiple access, CDMA, or WLAN principles, for example. Mobile 110 may be configured to seek attachment to a cell controlled by base station 130 when disposed inside a cell coverage area of such a cell.

FIG. 1 further illustrates short-range node 120. Short-range node 120 may comprise, for example, a near field communication, NFC, tag, Bluetooth tag, WLAN device or other communication device with short range. In some embodiments, the short range of communication may be provided by a connecting wire of fixed, short, length. A short length may be 5 centimeters, 50 centimeters, 2 meters or 10 meters, for example. Short-range node 120 is illustrated as being within wireless range of mobile 110 via wireless connection 125.

FIG. 1 further illustrates mobile 160, which may be disposed in a cell coverage area of a cell controlled by base station 130, but not within communication range of short-range node 120.

When a user of mobile 110 wishes to establish a cryptographic network protocol session with a correspondent node, exchange of encryption keys may be performed. Mobile 110 may be configured with the needed keys, in which case exchange of encryption keys has already been performed, and mobile 110 and the correspondent node may proceed to start establishing the session without further key exchange. Pre-configuring necessary keys, however, may be complicated since it is often difficult to predict, which sessions and between which nodes will be needed in the future.

Mobile 110 may be configured to obtain from short-range node 120 a pair of public-key cryptography keys. The pair comprises a public key and a secret key, the public and secret keys being linked together so that ciphertext encrypted with the public key is decipherable using the secret key. In practice, mobile 110 may accomplish this responsive to a user tapping a NFC tag, for example, with mobile 110. Short-range node 120 may generate the pair responsive to receiving the request, or alternatively short-range node may store a plurality of key pairs, which it is configured to provide responsive to requests or to opportunities to provide them. In some embodiments, the secret key is the same in all key pairs provided by short-range node 120. The public key provided by short-range node 120 bears a cryptographic signature. The cryptographic signature may be applied to the public key by short-range node 120 in connection with generating and/or providing the public key, for example by using a secret stored in short-range 120. The secret used in the signing may comprise a sequence of digital information usable for furnishing the public key with a cryptographic signature. An example of such a sequence is a separate secret key used in asymmetric cryptography or a password-like keyword. Signing may now comprise using the asymmetric cryptography and/or a hashing function, such as for example a hash-based message authentication code, HMAC, respectively. An example of a HMAC function is HMAC-MD5.

Upon receiving the pair of public-key cryptography keys, mobile 110 may store them, or at least the secret key, and participate in a signalling exchange with the correspondent node. In detail, mobile 110 may transmit a message to the correspondent node that comprises the public key that mobile 110 has received from short-range node 120. The message from mobile 110 comprising the public key may traverse wireless link 115, base station 130, connection 135, network node 140, connection 145, gateway 150 and connection 155 along the way toward the correspondent node, for example. Upon receiving the message comprising the public key, the correspondent node may verify the signature of the public key, using information the correspondent node has. For example, where the secret stored on short-range node 120 used to sign the public key comprises a secret key of short-range node 120, the correspondent node may use a public key of short-range node 120 to verify the signature of the public key received from mobile 110 is correct and that the public key has not been tampered with. Alternatively, a keyword of short-range node 120 may be used to verify the signature, for example in connection with using a hash-based authentication solution. In effect, trust with mobile 110 may be established in the correspondent node based on the signed public key.

A signature on a public key that is performed using a secret key may be used to determine the origin of the public key, the identity of the short-range node 120, and also that the public key has not been tampered in any way by mobile 110 or any node disposed along the communication path between mobile 110 and the correspondent node. A signature applied using a secret key may be verified using a public key associated with the secret key. The same pair of public key and secret key may be used both for encryption and decryption on the one hand, and signing and signature verification on the other hand.

Since short-range node 120 has a short range, in some embodiments communication even requiring touch with short-range node 120, the correspondent node may be confident mobile 110 is in a specific location, namely the location of short-range node 120, such as for example an access-controlled location, and the user has thus been authenticated in connection with entering the access-controlled location.

The public key may comprise a timestamp indicating a time when the public key was obtained in short-range node 120, the timestamp also being within the scope of the signature of the signed part of the public key. This enables the correspondent node to verify that mobile 110 has recently obtained the public key from short-range node 120. A recently obtained key may be considered as fresh. Since the timestamp is within the scope of the signature, the correspondent node is also enabled to detect in case the timestamp has been tampered with. In some embodiments, mobile 110 may provide additional data, or keys, to short-range node 120 for signing using the secret stored in short-range node 120. After signing this addition data, short-range node 120 may provide the signed additional data to mobile 110, which in turn may provide it to the correspondent node or another node.

Upon confirming the signature and in some embodiments also the freshness, of the public key, the correspondent node may continue with the process of establishing the cryptographic network protocol session, which may comprise a secure shell session, for example. Where the cryptographic network protocol session comprises a TLS or SSL session, establishing it may comprise use of at least one of a server-side certificate and a client-side certificate. For example, the correspondent node may generate a symmetric session key to be used in the session, encrypt the symmetric session key using the public key received from mobile 110, and transmit the encrypted symmetric session key to mobile 110. Mobile 110 may then decrypt the symmetric session key using the secret key received in mobile 110 from short-range node 120. Mobile 110 and the correspondent node may thereafter use symmetric encryption and the symmetric encryption key for the cryptographic network protocol session. This may be desirable as symmetric encryption may be faster to perform than asymmetric encryption. Alternatively to sending the encrypted symmetric session key, the correspondent node may transmit, encrypted with the public key, information enabling mobile 110 to generate an identical copy of symmetric session key.

Figure 2:
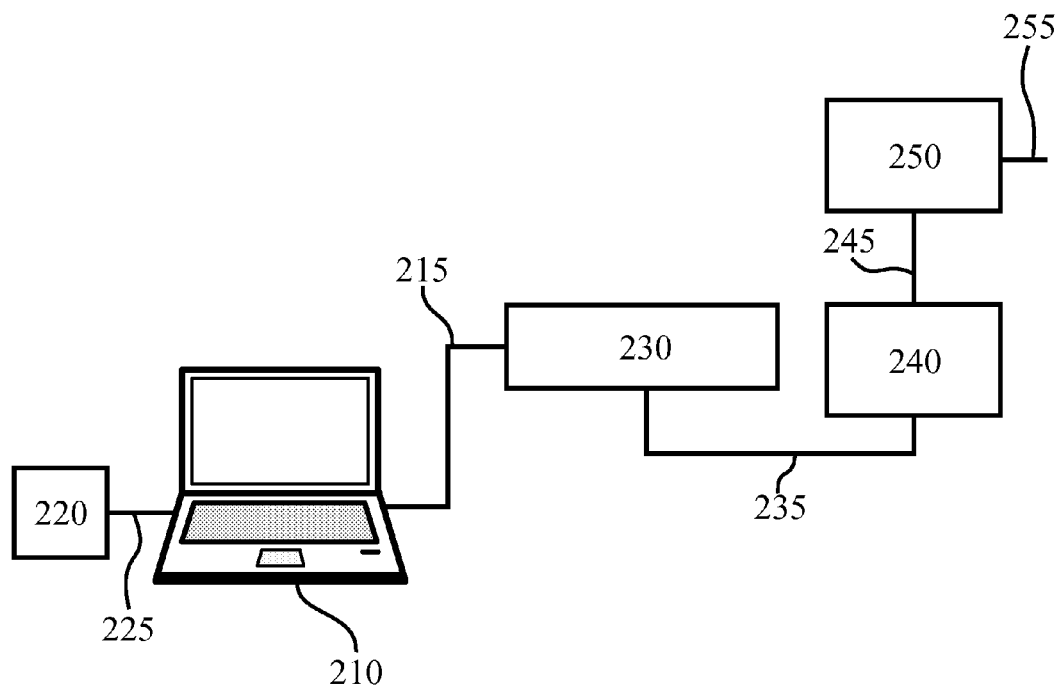
FIG. 2 illustrates a second example system capable of supporting at least some embodiments of the present invention.

FIG. 2 illustrates a second example electronic system capable of supporting at least some embodiments of the present invention. The system of FIG. 2 resembles that of FIG. 1, but in the embodiments of FIG. 2 some connections are wire-line rather than wireless. In detail, computer 210, which may comprise, for example, a laptop computer, tablet computer or a desktop computer, may interface with short-range node 220 using cable 225. In turn, computer 210 may communicate with the correspondent node via network cable 215, hub 230, network cable 235, first gateway 240, connection 245, second gateway 250 and connection 255. In some embodiments, second gateway 250 is absent. In some embodiments of FIG. 2, connection 225 is a touch-based connection, such as NFC, rather than a cable. In embodiments of FIG. 2, computer 210 may a role similar to that played by mobile 110 in embodiments of FIG. 1.

Figure 3:
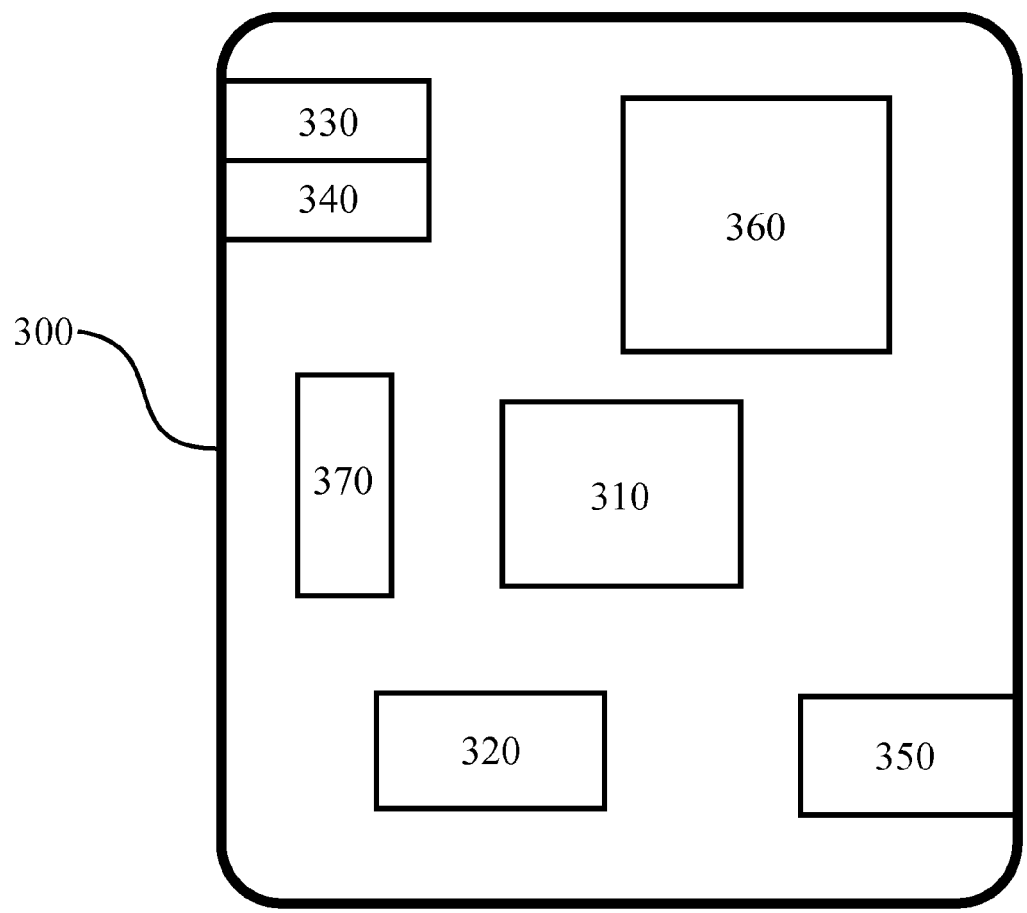
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as mobile 110 of FIG. 1 or a computer 210 of FIG. 2. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may comprise computer instructions that processor 310 is configured to execute. Memory 320 may be means for storing information.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300. Where device 300 comprises a computer or other device with no cellular communication capability, User identity module 370 may be absent.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
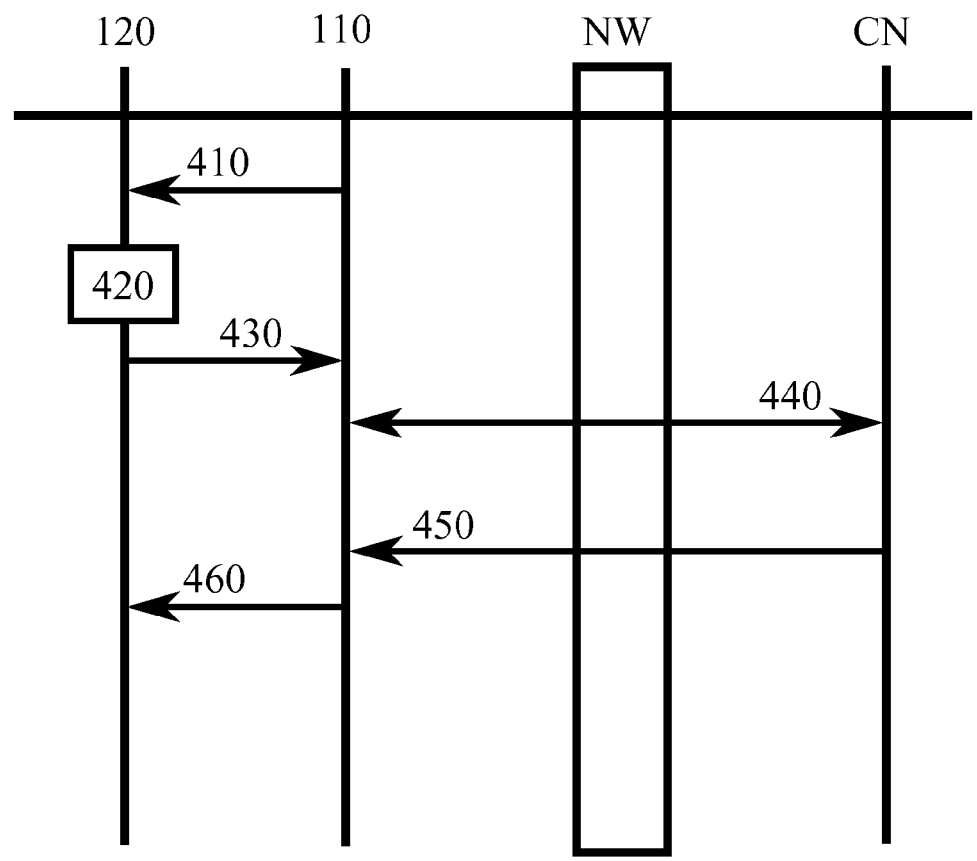
FIG. 4 illustrates signalling in accordance with at least some embodiments of the present invention.

FIG. 4 illustrates signalling in accordance with at least some embodiments of the present invention. Illustrated are on the vertical axes, from left to right, short-range node 120, mobile 110, a network NW, and finally correspondent node CN. Alternatively, the first two vertical axes may correspond to short-range node 220 and computer 210 of FIG. 2, for example. In the description of FIG. 4 below the terms mobile 110 and short-range node 120 are used as examples.

In phase 410, mobile 110 may indicate to short-range node 120 that it needs a pair of cryptographic keys. Alternatively, mobile 110 may simply enable short-range node 120 to know mobile 110 is within communication range of short-range node 120.

In phase 420, short-range node 120 may obtain the pair of cryptographic keys. The pair of cryptographic keys may be obtained in short-range node 120 by retrieving it from a memory internal to short-range node 120. Alternatively, short-range node 120 obtain the pair of cryptographic keys by generating, responsive to phase 410, a public key and a secret key to form the pair of cryptographic keys. A public key comprised in the pair of cryptographic keys may be signed by short-range node 120 using a secret, wherein the secret may comprise, for example, a separate secret key of the short-range node 120. In some embodiments, the secret key of short-range node 120 is not the same secret key as the secret key comprised in the pair of cryptographic keys. In other embodiments, the same secret key may be the secret key of short-range node 120 and the secret key comprised in the pair of cryptographic keys.

The pair of cryptographic keys comprises a public key and a secret key, the public and secret keys being linked together so that ciphertext encrypted with the public key is decipherable using the secret key.

In phase 430, short-range node 120 provides the pair of cryptographic keys to mobile 110. The messaging of phases 410 and 430 may take place over a suitable short-range communication interface, such as for example NFC, Bluetooth or a cable of limited length.

In phase 440, mobile 110 and the correspondent node establish a cryptographic network protocol session, such as for example a secure shell session of a cryptographic virtual private network, VPN, session. Messaging of phase 440 may be two-way. Messaging of phase 440 may traverse a network of nodes, for example base station 130, network node 140, gateway 150, and further nodes along a communication path between mobile 110 and the correspondent node.

In optional phase 450, the correspondent node may inform mobile 110 of a revocation of a secret key of short-range node 120, or of another key. Responsive to the message of phase 450, mobile 110 may in optional phase 460 convey the revocation to short-range node 120. For example, mobile 110 may display a message to a user that interaction with short-range node 120 is needed, and when the user responsively brings mobile 110 to communication range of short-range node 120, the message of phase 460 may be used to convey information of the revocation to short-range node 120.

Figure 5:
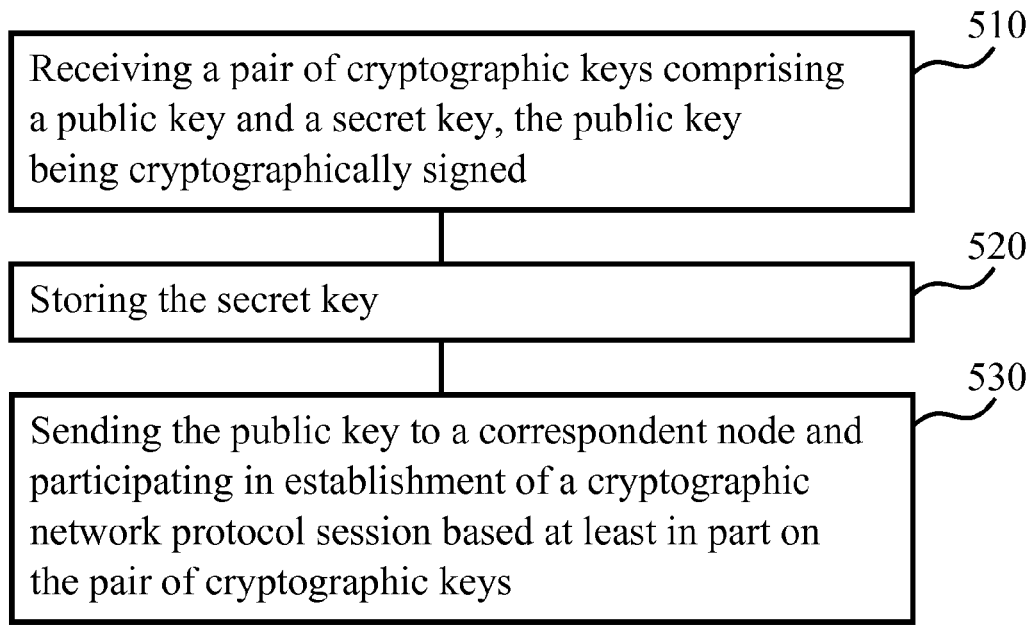
FIG. 5 shows a first flowchart of a first method in accordance with at least some embodiments of the present invention.

FIG. 5 shows a first flowchart of a first method in accordance with at least some embodiments of the present invention. The phases of the illustrated method may be performed in mobile 110 or computer 210, for example. Phase 510 comprises receiving a pair of cryptographic keys comprising a public key and a secret key, the public key being cryptographically signed. Phase 520 comprises storing the secret key. Finally, phase 530 comprises sending the cryptographically signed public key to a correspondent node and participating in establishment of a cryptographic network protocol session based at least in part on the pair of cryptographic keys. The pair of cryptographic keys comprises a public key and a secret key, the public and secret keys being linked together so that ciphertext encrypted with the public key is decipherable using the secret key.

Figure 6:
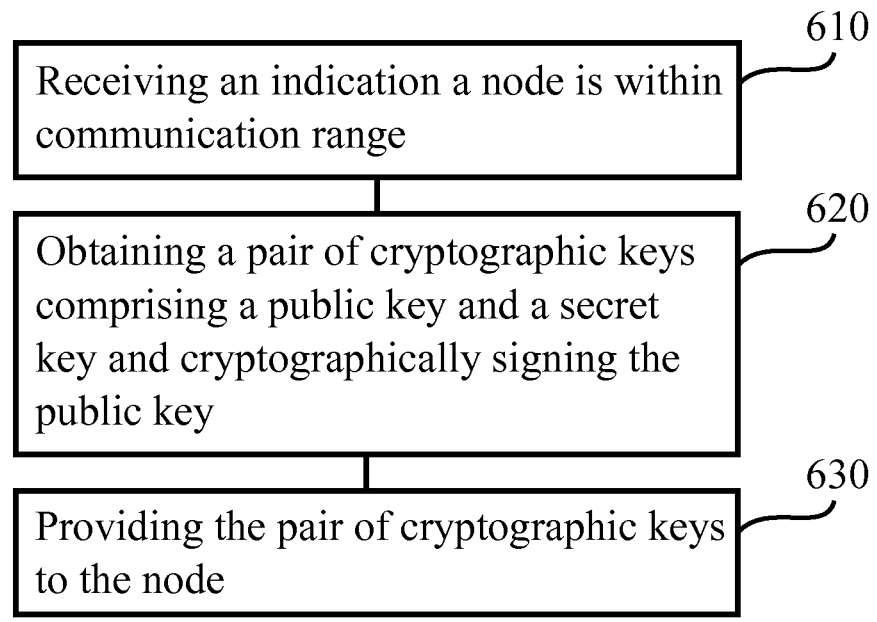
FIG. 6 shows a second flowchart of a second method in accordance with at least some embodiments of the present invention.

FIG. 6 shows a second flowchart of a second method in accordance with at least some embodiments of the present invention. The phases of the illustrated method may be performed in short-range node 120 or 220, for example. Phase 610 comprises receiving an indication a node is within communication range. Phase 610 may comprise receiving, internally in a short-range node, the indication, such as for example receiving it in a processing core comprised in the short-range node. Phase 620 comprises obtaining a pair of cryptographic keys comprising a secret key and a public key and cryptographically signing the public key. Finally, phase 630 comprises providing the pair of cryptographic keys to the node.

The pair of cryptographic keys comprises a public key and a secret key, the public and secret keys being linked together so that ciphertext encrypted with the public key is decipherable using the secret key.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
a receiver configured to receive, over a short range communication from a short range node, a pair of cryptographic keys comprising a public key and a secret key, the public key being cryptographically signed with a secret key of the short range node;
a memory configured to store the secret key, and
a transmitter configured to send the cryptographically signed public key to a correspondent node and participate in establishment of a cryptographic network protocol session based at least in part on the pair of cryptographic keys, wherein the apparatus is configured to omit a step of entering a password from the establishment of the cryptographic network protocol session as a response to using the pair of cryptographic keys,
wherein the public key comprises a timestamp, within a scope of the cryptographic signature, indicating a time when the public key was obtained in the short range node, and
the apparatus is configured to act as an endpoint in the cryptographic network protocol session at least in part by decrypting information received over the cryptographic network protocol session using the secret key.

2. An apparatus according to claim 1, wherein the receiver is configured to receive the pair of cryptographic keys over a short-range wireless interface.

3. An apparatus according to claim 1, wherein the apparatus is configured to receive the pair of cryptographic keys from a stationary device fixed to a location.

4. An apparatus according to claim 1, wherein the cryptographic network protocol session comprises at least one of a secure shell protocol, a secure virtual private network protocol, a transport layer security protocol, and a secure sockets layer protocol.

5. An apparatus according to claim 1, wherein the apparatus is configured to receive a public key of the correspondent node in encrypted form, to decrypt the public key of the correspondent node using the secret key and to use the decrypted public key of the correspondent node to encrypt information before sending it to the correspondent node using the cryptographic network protocol session.

6. A method in an electronic device comprising:
receiving, over a short range communication from a short range node, using a receiver of the electronic device, a pair of cryptographic keys comprising a public key and a secret key, the public key being cryptographically signed with a secret key of the short range node;
storing the secret key,
sending, using a transmitter of the electronic device, the cryptographically signed public key to a correspondent node and participating in establishment of a cryptographic network protocol session based at least in part on the pair of cryptographic keys, wherein a step of entering a password is omitted from the establishment of the cryptographic network protocol session as a response to using the pair of cryptographic keys, and
acting as an endpoint in the cryptographic network protocol session at least in part by decrypting information received over the cryptographic network protocol session using the secret key,
wherein the public key comprises a timestamp, within a scope of the cryptographic signature, indicating a time when the public key was obtained in the short range node.

7. A method according to claim 6, wherein the receiving comprises receiving the pair of cryptographic keys over a short-range wireless interface.

8. A method according to claim 6, wherein the receiving comprises receiving the pair of cryptographic keys from a stationary device fixed to a location.

9. A method according to claim 6, wherein the cryptographic network protocol session comprises at least one of a secure shell protocol, a secure virtual private network protocol, a transport layer security protocol, and a secure sockets layer protocol.

10. A method according to claim 6, further comprising receiving a public key of the correspondent node in encrypted form, decrypting the public key of the correspondent node using the secret key and using the decrypted public key of the correspondent node to encrypt information before sending it to the correspondent node using the cryptographic network protocol session.

11. A non-transitory computer readable medium having stored thereon a set of computer readable instructions that, when executed by at least one processor, cause an apparatus to at least:
receive, over a short range communication from a short range node, a pair of cryptographic keys comprising a public key and a secret key, the public key being cryptographically signed with a secret key of the short range node;
store the secret key,
send the cryptographically signed public key to a correspondent node and participate in establishment of a cryptographic network protocol session based at least in part on the pair of cryptographic keys, wherein a step of entering a password is omitted from the establishment of the cryptographic network protocol session as a response to using the pair of cryptographic keys, and
act as an endpoint in the cryptographic network protocol session at least in part by decrypting information received over the cryptographic network protocol session using the secret key,
wherein the public key comprises a timestamp, within a scope of the cryptographic signature, indicating a time when the public key was obtained in the short range node.

* * * * *